United States Patent [19]

Lee, Jr.

[11] Patent Number: 4,554,440

[45] Date of Patent: Nov. 19, 1985

[54] AUTOMATIC CIRCUIT CONTROL FOR ELECTRICAL RESISTANCE COOKING APPARATUS

[76] Inventor: Maurice W. Lee, Jr., P.O. Box 25, Boley, Okla. 74829

[21] Appl. No.: 520,768

[22] Filed: Aug. 8, 1983

Related U.S. Application Data

[63] Continuation-in-part of Ser. No. 290,993, Aug. 7, 1981, abandoned.

[51] Int. Cl.⁴ ............................................. H05B 1/02
[52] U.S. Cl. .................................. 219/501; 219/497; 219/295; 99/358; 340/664
[58] Field of Search .............. 219/492, 493, 497, 485, 219/295, 501; 99/358; 340/526, 664

[56] References Cited

U.S. PATENT DOCUMENTS

| | | | |
|---|---|---|---|
| 3,543,673 | 12/1970 | McDevitt | 219/295 |
| 3,651,753 | 3/1972 | Schmidt | 219/295 |
| 3,842,724 | 10/1974 | Korr et al. | 99/358 |
| 4,001,808 | 1/1977 | Ebihara et al. | 340/664 |
| 4,093,847 | 6/1978 | Walker et al. | 219/295 |
| 4,262,191 | 4/1981 | Lepper et al. | 219/295 |

*Primary Examiner*—M. H. Paschall
*Attorney, Agent, or Firm*—Robert K. Rhea

[57] ABSTRACT

In an electric resistance cooker for quickly cooking food, such as ground meat, contactably interposed between electrodes, a food doneness control circuit is connected with the supply circuit. The control circuit senses the rate of change of the root mean square of current through the food as a function of its cooked condition and stops current to the electrodes in response to a predetermined rate of change of the root mean square value of the current through the food.

11 Claims, 6 Drawing Figures

AUTOMATIC CIRCUIT CONTROL FOR ELECTRICAL RESISTANCE COOKING APPARATUS

This application is a continuation-in-part of application Ser. No. 06/290,993, filed 8/7/1981 now abandoned.

BACKGROUND OF THE INVENTION

1. Field of the Invention

The present invention relates to electrical resistance cooking and more particularly but not by way of limitation, to a method of cooking food and a circuit detecting and interrupting the current at an optimum point in the cooking cycle.

2. Description of the Prior Art

This invention also relates to and the most pertinent prior patent is believed U.S. Pat. No. 3,167,431 which discloses a housing containing a pair of electrodes underlying a third electrode for receiving a quantity of food stuff, such as ground meat, between the electrodes to be cooked by the electrical resistance of the food. A source of electrical energy is connected with the pair of electrodes to complete a circuit through the food and the third electrode. This apparatus functions as intended, however, it is difficult to determine the exact point in the cooking cycle where the circuit must be opened to achieve an optimum palatable condition of the food. If the current continues beyond a point in which the food has been completely cooked, arcing occurs resulting in an undesirable taste, burning and smell of the cooked food.

The circuit of this invention is responsive to the current through the food and dicontinues the current at an optimum cooked condition of the food.

Schmidt U.S. Pat. No. 3,651,753 discloses a cycle eliminator current control for an electric cooker in which an electronic valve, connected in series with the power supply, is triggered at the beginning of each half cycle of the power. A series connected resistor, varying with the magnitude of the current, blocks the valve trigger circuit during half cycles of a given polarity when the current exceeds a predetermined threshold. By eliminating cycles, the Schmidt patent limits the magnitude of current applied to the food stuff.

Korr et al U.S. Pat. No. 3,842,724 discloses a phase shift current control for electric resistance of cooking of food which utilizes a thermostat to determine when the food being cooked reaches a desired temperature and stop cooking wherein a current intensity sensor and/or a current change sensor actuates a Schmitt trigger to operate in succession one or more of a series of relays for reducing the current through the food to prevent overheating and burning of the food.

This invention is distinctive over the Schmidt and Korr patents by providing an electrical resistance cooking circuit control and method of cooking food, such as ground meats, in which time or temperature of the food are not controlling factors nor is the magnitude of current restricted by cycle elimination or controlled by phase shift but the rate of change of the RMS (root mean square) value of the current is sensed to determine when the current through the food, at a point near its peak, changes as a function of the cooked condition (doneness) of the food wherein the rate of change in current magnitude is utilized to electronically discontinue the current through the food and completely discontinue cooking of the food at an optimum cooked condition. In this invention the current flows continuously, without interruption, until the desired degree of doneness is reached and the current is stopped thereby ceasing cooking at the optimum point.

SUMMARY OF THE INVENTION

In one embodiment, in an electrical resistance cooking apparatus, having a pair of electrodes respectively connected with a source of alternating current completes a circuit through a third electrode and food stuff interposed between the electrodes. A transformer and triac are interposed in series in one of the AC power supply wires to one electrode. The secondary of the transformer is rectified and applied to a primary amplifier connected in series with a differentiating amplifier having its output connected with a comparator circuit with its output connected to the base of a transistor. The collector of the transistor is connected with one end of the coil of a double-pole single-throw relay having one of its contacts connected with the positive voltage supply of the comparator circuit. The other contact of the relay connects the gate of the triac with the AC. A starting switch also connects the other end of the relay coil with the comparator circuit positive voltage source for energizing the relay. With food stuff between the electrodes and the starting switch closed, a circuit is completed through the coil of the relay to close its contacts and maintain the triac conductive. As long as current resistance of the food stuff is decreasing, the output of the comparator circuit biases the base of the transistor to maintain it conductive and the relay energized. At the point when the food stuff becomes fully cooked and electrical resistance of the food increases the comparator circuit output applies a stop cooking signal to the base of the transistor thus interrupting current through the transistor and de-energizing the relay to open the triac circuit.

In another embodiment, current controls added to the comparator circuit permit a selection between "rare" and "well-done" of the food prior to starting the cooking cycle and an override timer circuit is added to the relay circuit to start the cooking cycle when a "rare" setting is selected or for restarting the cooking cycle.

The principal objects are to provide a circuit which automatically discontinues current in an electrical resistance food cooking unit, at an optimum condition of the food thereby preventing under cooking or overcooking and provide a manual preselection of the "done" condition of the food and provide an override control for restarting or continued cooking or discontinuing the current in the event of malfunction or at the will of the operator.

Another object is to set forth a method of electrical resistance cooking food, such as ground meat, in which the preselected "done" condition of the food is obtained by discontinuing the current through the food in response to a predetermined rate of change in current magnitude. unit, at an optimum condition of the food thereby preventing under cooking or overcooking and provide a manual preselection of the "done" condition of the food and provide an override control for restarting or continued cooking or discontinuing the current in the event of malfunction or at the will of the operator.

DESCRIPTION OF THE PREFERRED EMBODIMENTS

Figure 2:
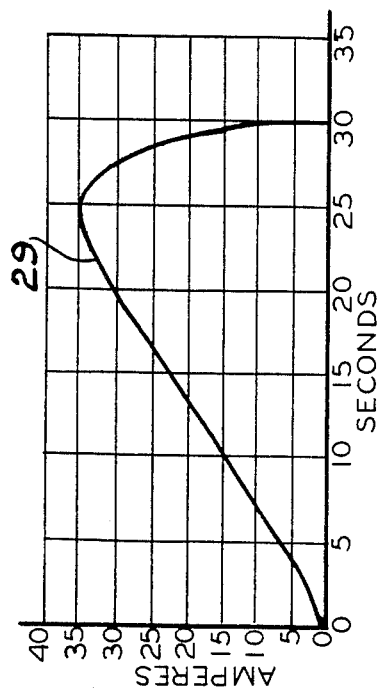
FIG. 2 is an approximate current value diagram.

Like characters of reference designate like parts in those figures of the drawings in which they occur.

Figure 1:
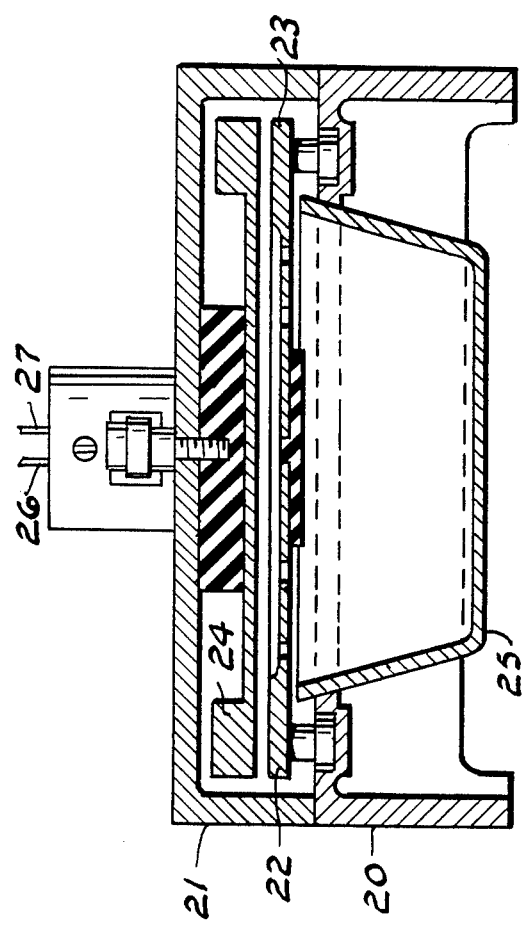
FIG. 1 is a vertical cross sectional view of a prior art resistance cooking apparatus.

In the drawings:

Referring more particularly to the prior art resistance cooker illustrated by FIG. 1, the reference numeral 20 indicates the base of a housing having an overlying hingedly connected lid 21. The base supports, in electrically insulated relation, a pair of laterally spaced electrodes 22 and 23 and a third electrode 24 in overlying vertically spaced relation with respect to the pair of electrodes 22 and 23 for receiving a quantity of food stuff such as ground meat, not shown, therebetween. This plate arrangement may be reversed as shown by the wiring diagram. The base 20 further supports a grease receiving receptacle 25. A source of electrical energy, indicated by the wires 26 and 27, is connected with the pair of electrodes 22 and 23.

The curve 29 of FIG. 2 illustrates the approximate current values when the resistance cooker is operated with food, such as a ground meat patty 28 of selected mass, interposed between the electrodes 22-23 and 24. The current starts at zero and gradually rises each second to a peak of approximately 35 amperes at the end of approximately 25 seconds. The current then declines sharply in comparison to its rise.

Figure 2A:
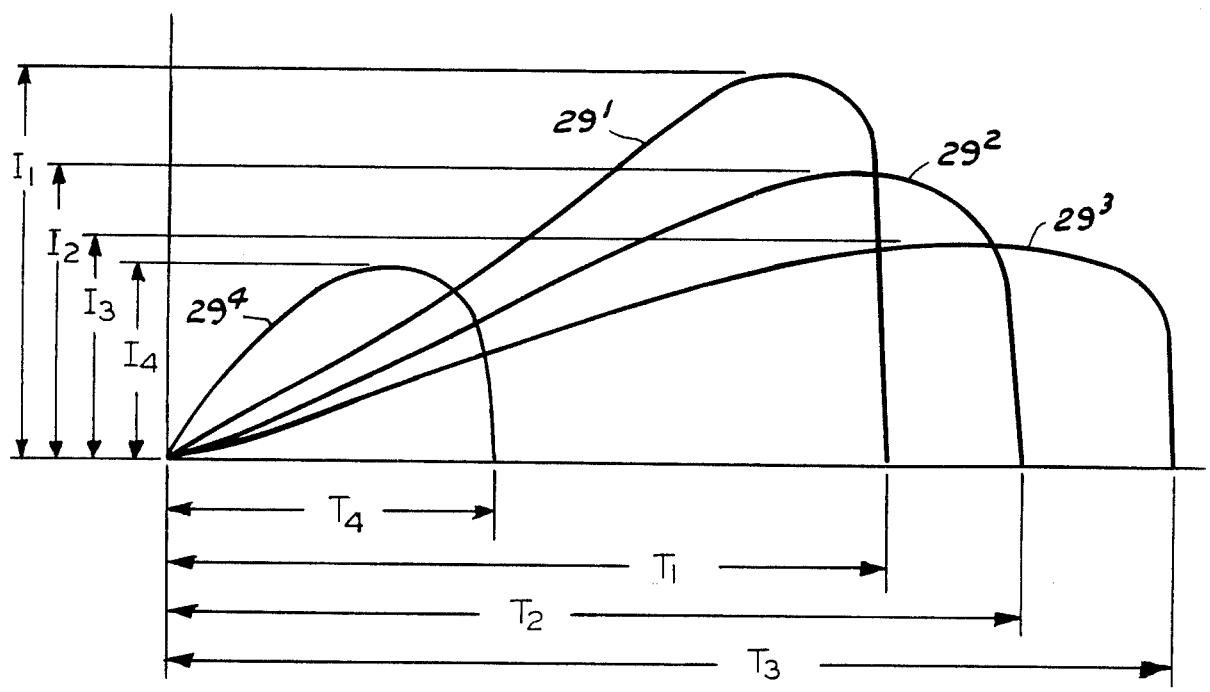
FIG. 2A is a diagram, similar to FIG. 2, of four separately cooked quantities of ground meat.
Figure 2B:
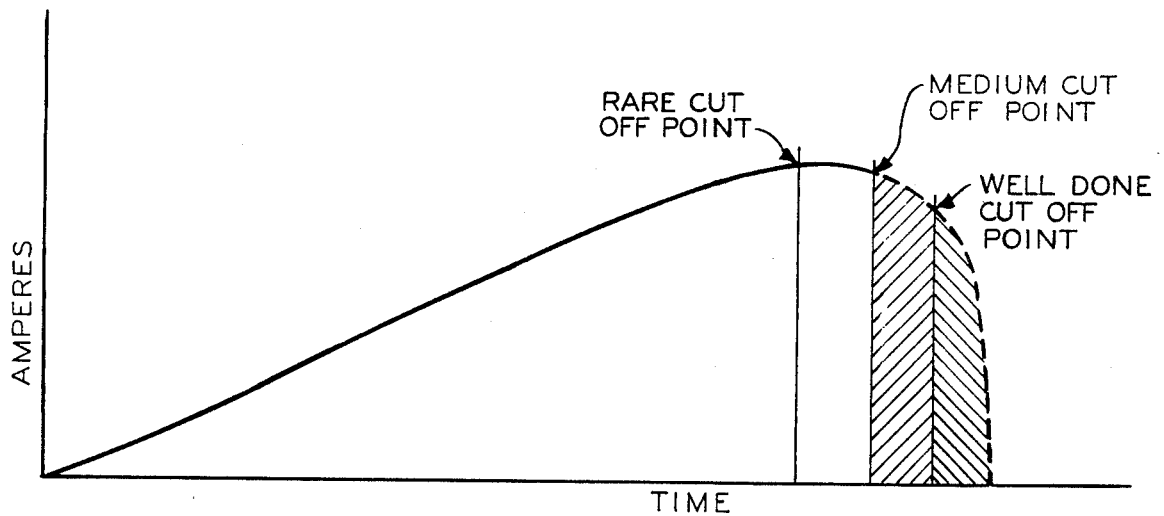
FIG. 2B is a current value diagram illustrating rate of current change at preselected cooked conditions of food.

Time is not a controlling factor and it varies with the mass and ingredients of the food stuff, as is illustrated by the curves $29^1$ through $29^4$ of FIG. 2A. This FIG. (2A) clearly illustrates the rate of current (I) change with time (T) in accordance with the diameter, thickness and chemical content of the food stuff. In the four cooking examples represented by the curves $29^1$ through $29^4$ only the shape of the curve, which represents the RMS (root mean square) values of the current through the food stuff, remains constant. This invention does not alter this current curve but recognizes the shape and stops the flow through the food stuff at the optimum point of doneness and contrasted with prior art devices which temporarily interrupt the current during cooking for power control and thus alters the shape of this curve without stopping the cooking process or which stops cooking thermostatically.

As mentioned hereinabove, when operating the resistance cooker manually it is very difficult to determine the exact point where the current must be discontinued to obtain the preferred done condition of the food.

Figure 3:
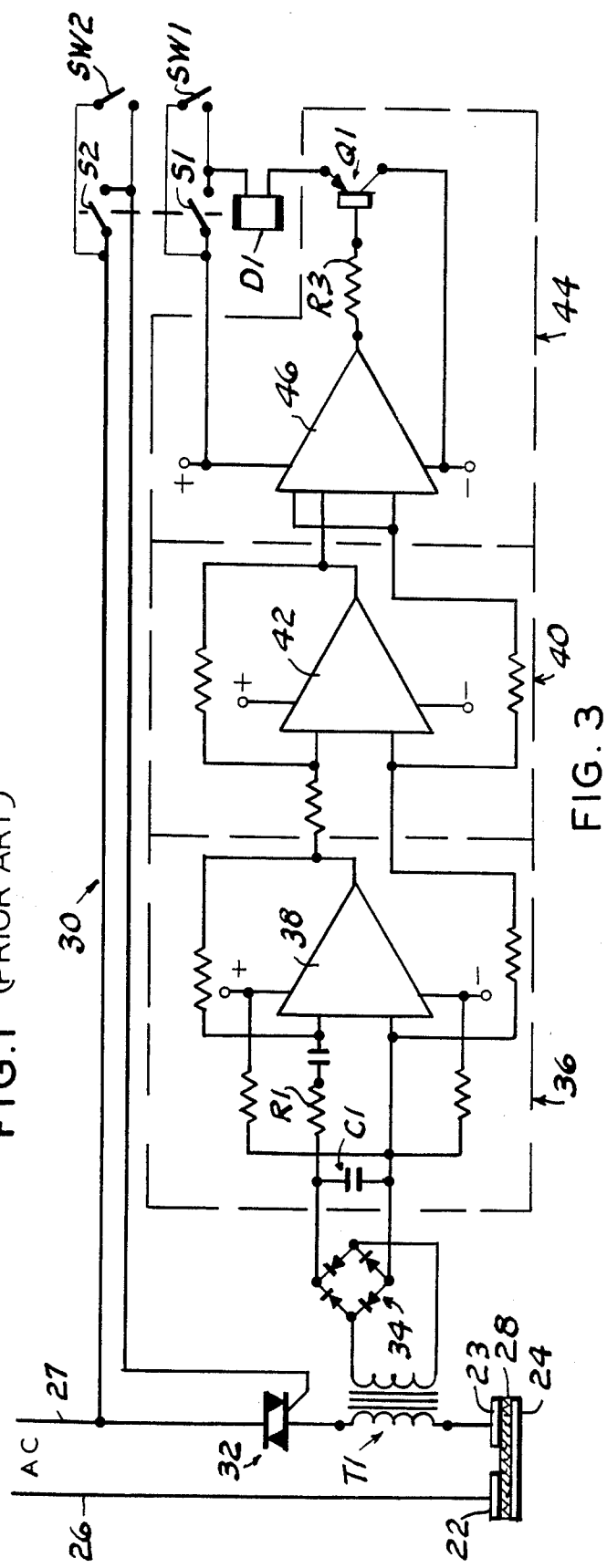
FIG. 3 is a wiring diagram of one embodiment.

FIG. 3 illustrates a circuit 30 for detecting the current peak and discontinuing the current to discontinue the cooking of food, such as the ground meat patty 28, in accordance with the desired doneness and many variables, such as the diameter and thickness of the patty, moisture, fat and chemical content. The circuit 30 detects current through the wire 27.

A triac 32 (bidirectional triode thyristor) is connected in series in the wire 27 and acts as a current value as current applied to or removed from its gate, biases it off and on, to discontinue or allow current through the wire 27, as presently explained.

A transformer T1 has its primary winding connected in series in the wire 27 between the triac and the electrode 23. The voltage drop across the primary is a direct reflection of the current passing through the food 28.

The secondary winding voltage is rectified by a diode bridge arranged as a full wave rectifier 34 with the rectified voltage reduced and filtered by a resistor R1 and a capacitor C1 and applied to a differentiating circuit 36 including an operational amplifier 38. The signal from the differentiating circuit 36 is fed to a buffer circuit 40 including a second operational amplifier 42. The signal from the amplifier 42 is fed to a comparator circuit 44 including an amplifier 46 having its output signal connected through a resistor R3 to the base of a PNP transistor Q1.

The collector of the transistor Q1 is connected with the negative voltage supply of the comparator amplifier 46. The emitter of the transistor Q1 is connected with one end of the coil of a normally open double-pole single-throw relay D1. The other end of the relay coil is connected with the positive current supply of the comparator amplifier 46 through one terminal S1 of the relay D1. A normally open starting switch SW1 bridges the relay terminal S1 for initially energizing the relay, as presently explained. The other relay terminal S2 is connected in series between the gate of the triac 32 and alternating current source wire 27. A normally open override switch SW2 bridges the relay terminal S2 for continuing the cooking cycle as presently explained. It is believed obvious the relay D1 may be replaced by a solid state latching circuit to accomplish the same function.

A standard power supply, such as the direct current source circuit 55 (FIG. 4), is provided for supplying the required positive and negative direct current voltage to the amplifiers of the circuits 36, 40 and 44.

In the operation of the circuit 30 and assuming food 28 has been placed between the electrodes 22-23 and 24, the cooking cycle is started by momentarily closing the starting switch SW1 which energizes the coil of relay D1 and holds its terminals S1 and S2 closed. Relay terminal S1 maintains the relay energized until the transistor Q1 is rendered nonconductive. Closed relay terminal S2 applies current to the gate of the triac 32 to render it conductive and current through the primary of transformer T1 thus completing a circuit through the food 28. As amperage increases, as a result of the resistance of the food, and, as shown by the curve 29 of FIG. 2, the rectified current from the secondary winding of the transformer T1, detected by the differentiating circuit 36, is in turn fed to the comparator 44 which biases the base of the transistor Q1 to maintain it conductive and relay D1 energized. When the food 28 is cooked and the current simultaneously reaches its peak the differentiating circuit 36 sends a zero signal to the comparator circuit 44. As the current declines the output signal of the comparator circuit biases the transistor Q1 to render it nonconductive thus de-energizing relay D1 and terminating the cooking operation by rendering the triac 32 nonconductive.

In the event it is desired to further cook the food stuff, current may again be applied to the electrodes by manually closing the override switch SW2 to render the triac 32 conductive. In this event the switch SW2 must be maintained closed to continue the cooking for a desired time interval.

Figure 4:
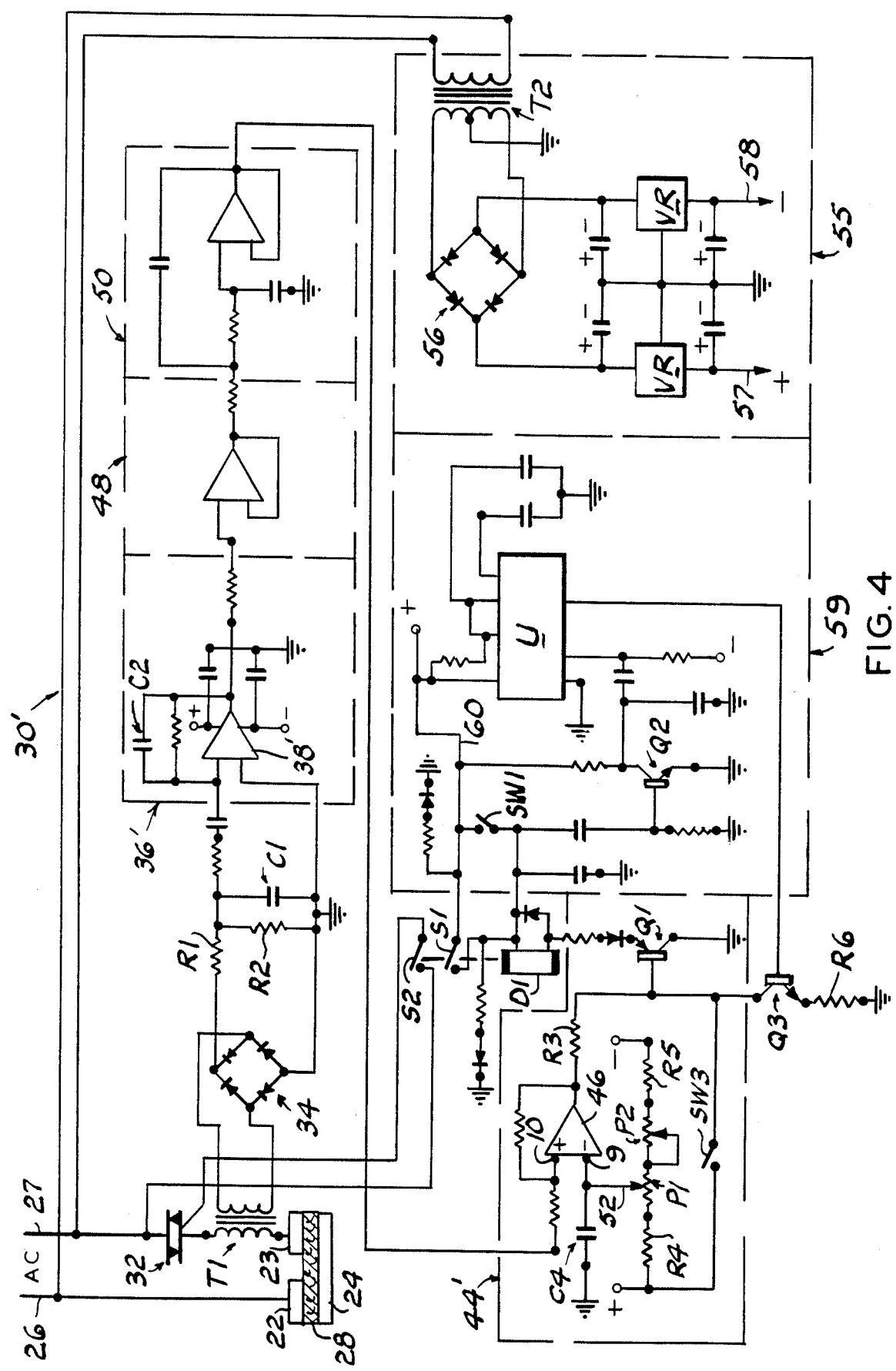
FIG. 4 is a wiring diagram of another embodiment.

The circuit 30' of FIG. 4 is substantially identical to the circuit of FIG. 3, modified to permit preselection of the cooking cycle between "rare" and "well done" of the food 28.

In FIG. 4, voltage from the rectifier 34 is divided by the resistors R1 and R2 and filtered by the capacitor C1 and applied to the differentiating circuit 36'. This circuit 36' is designed to differentiate input signals in the vicinity of 0.00833 Hertz for detecting not only the peak current value but points in the curve 29 of FIG. 2 occuring just before and following the peak of the cooking current curve (which approximates the first half of a sine wave). A zero crossing of the differentiated input signal will now coincide with the current peak in the cooking cycle. Since gain increases with frequency in a differentiation amplifier resulting in noise which may interfere with the intended signal at the output of the amplifier, a capacitor C2 is added to the feedback circuit of the amplifier 38' which has the effect of leveling off the high end of the frequency response curve.

A buffer circuit 48 is connected with the differentiating circuit 36' for isolating the differentiating circuit from the low-pass filter circuit 50 connected with the buffer circuit 48 and in turn connected to the comparator circuit 44'. The filter circuit 50 removes any frequency component that is very much above 20 Hertz. This is accomplished by positive feedback of the high frequency components, 180° output of phase, in this operational amplifier circuit wired as a voltage follower in which gain=1.

The comparator circuit 44', which may be called a doneness detection circuit includes the amplifier 46 wired for a very high gain in which a positive feedback is used to provide a measure of hysteresis (stability during transitions). The voltage of the negative input pin 9 is the reference voltage for the comparator and it is this reference voltage which determines whether or not termination of cooking occurs before, during or after the current has reached its peak. If this reference voltage is set at zero volts (grounded) the comparator output will kick high (stop cooking) at the peak of the current curve. By setting the voltage at some negative value the comparator output will kick high prior to the current peak and correspondingly will kick high just after the current peak if the reference voltage is set to a positive voltage value.

Through experience I have found that −0.75 volts to +0.25 volts provides a good range of rare to well-done of the food being cooked.

Accordingly, a potentiometer P1, having its wiper arm 52 connected with pin 9, serves as a doneness control. A second potentiometer P2 is connected in series with the potentiometer P1 and serves as an adjustment for shifting the 1 volt wide window at pin 9 towards rare or toward well-done. Resistors R4 and R5, respectively, connected in series with the potentiometers P1 and P2 and respectively connected with a direct current source 55, to be presently described, determine in conjunction with the overall resistance value of potentiometer P1 the size (approximately 1 volt) of the pin 9 window. A bypass capacitor C4 connects the pin 9 to ground.

Any direct current source may be utilized for the amplifiers and other components of the circuit. By way of example, the circuit 55 includes a second transformer T2 having its primary winding connected with the source wires 26 and 27 with the secondary winding rectified by a full wave rectifier 56. The output of the rectifier 56 is respectively connected with a pair of voltage regulators VR to supply positive and negative voltage connections 57 and 58 where needed in the circuit of either FIGS. 3 or 4.

This comparator driven circuit 30' cannot be energized to start the cooking cycle when doneness selection of the food setting of the potentiometer P1 is below a "medium" condition for the food. A low comparator reference setting less than zero volts, at the window of the pin 9, for a rare condition of the food results in a comparator high output or stop cooking signal to the base of transistor Q1. In order to temporarily defeat this function of the comparator circuit 44', a timer circuit 59 is added to the relay starting circuit and connected with the comparator circuit to provide a temporary override of the comparator circuit "off" output signal. The timing circuit 59 includes a timer U connected with the voltage supply 55. The timer is connected with the starting switch SW1 through an inverter transistor Q2. The timer output is connected with the base of a third transistor Q3 having its collector connected with the comparator output and the base of the transistor Q1 and its emitter connected to ground through a resistor R6. When the starting switch SW1 is closed, the timer sends a high signal to the base of transistor Q3 to render it conductive which in turn overrides the output of the comparator circuit 44' and drives the base of transistor Q1 to conduct and ground one end of the relay D1 coil, thus energizing relay D1 so that its terminal S2 biases the gate of the triac 32 to start the cooking cycle while the relay terminal S1 maintains the relay energized. In the first 1.5 seconds of any cooking cycle of this resistance cooker the comparator input signal (pin 10) will quickly fall below the low or rare reference voltage at pin 9 and thereby enable the comparator to maintain the circuit energized and the cooking cycle in operation without further controls by the timer.

Normally open stop switch SW3, connected between the base of the transistor Q1 and the collector of transistor Q3, is connected at its other end to DC source to bias the base of transistor Q1 high and override either the output of the comparator 44' or the transistor Q3 to stop the cooking cycle at the will of the operator.

Obviously the invention is susceptible to changes or alterations without defeating its practicability. Therefore, I do not wish to be confined to the preferred embodiment shown in the drawings and described herein.

I claim:

1. A food cooking control for an electric resistance cooker in which the magnitude of the RMS value of electrode current generated from an AC source passing through food interposed between electrodes increases until the food is substantially cooked, the improvement comprising: an electric supply circuit;

thyristor means arranged in series in the electric supply circuit for uninterruptedly supplying continuous cycle current to said electrodes while the food is cooking, said thyristor means including a gate control element having an electric gate voltage supply circuit;

switch means in said gate voltage supply circuit for selectively closing and opening the gate voltage circuit and respectively rendering said thyristor means conductive and nonconductive;

current detection means including a differentiating amplifier/comparator circuit connected with the electric supply circuit through a current transformer for sensing the rate of change of the RMS value of current through the food as a function of its cooked condition; and, electric switch operator means including an electric circuit interposed between said current detection means and said switch means for opening the gate of the voltage supply circuit in response to a predetermined rate of change of the RMS value of the current through the food indicating the end of the cooking process and a selected cooking doneness of of the food.

2. The combination according to claim 1 in which said switch means includes:
a relay having a coil; and,
a starting switch for initially energizing said relay.

3. The combination according to claim 2 in which said switch operator means circuit includes:
a first transistor connected with one end of the relay coil; and,
an amplifier having its output connected with the base of said first transistor and forming a sensed current comparator biasing said first transistor non-conductive in response to said predetermined current rate of change.

4. The combination according to claim 3 in which said amplifier is characterized by a negative volt input pin and further including:
adjustable resistance means connecting a predetermined voltage potential to said input pin for a rare to "well done" setting.

5. The combination according to claim 4 and further including:
timer circuit means including a timer connected with said starting switch and said switch operator means circuit for energizing said relay when said resistance means is set at a negative potential; and,
a second transistor connecting the output of said amplifier and the base of said first transistor to ground,
said timer being connected with the base of said second transistor whereby said timer biases said second transistor conductive in response to closing said starting switch.

6. The method of controlling power input during electrical resistance cooking of food, comprising: interposing food to be cooked between spaced-apart electrodes;
uninterruptedly applying continuous cycle electric potential across the electrodes;
continually sensing the current passing through the food; and,
discontinuing the electrode current in response to a predetermined rate of change of the RMS value of the current as a function of the cooked condition of the food indicating the end of the cooking process and a selected cooking doneness of the food.

7. The method of cooking food in an electrical resistance cooker in which the magnitude of electrode current generated from an AC source passing through food between electrodes increases until the food is substantially cooked, comprising:
selecting a desired done condition of the food to be cooked;
uninterruptedly applying the continuous cycle AC source to the electrodes;
continually sensing the rate of change of the RMS value of the electrode current passing through the food; and,
discontinuing the electrode current in response to a sensed predetermined rate of change in the RMS value of the electrode current magnitude as a function of the cooked condition of the food indicating the end of the cooking process and a selected cooking doneness of the food.

8. A method for electrically cooking food as disposed between first and second electrodes, comprising the steps of:
uninterruptedly passing continuous cycle current flow from an alternating current electric source between said first and second electrodes through said food; and,
allowing said current to flow continuously without interruption through the food until ceasing current flow when the rate of change in the RMS value of the current per time is equal to a selected algebraic value that yields a selected cooking doneness of the food.

9. A method as set forth in claim 8 wherein said selected algebraic value is zero.

10. A method as set forth in claim 8 wherein said selected algebraic value is a negative value.

11. A method as set forth in claim 8 wherein said selected algebraic value is a positive value.

* * * * *